United States Patent
Sattler et al.

(10) Patent No.: US 9,541,176 B2
(45) Date of Patent: Jan. 10, 2017

(54) DRIVE DEVICES FOR MOVEMENT UNITS OF MACHINE TOOLS AND RELATED MACHINE TOOLS

(71) Applicant: TRUMPF Werkzeugmaschinen GmbH + Co. KG, Ditzingen (DE)

(72) Inventors: Martin Sattler, Leonberg (DE); Jan Lukas Hilgermann, Stuttgart (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 7 days.

(21) Appl. No.: 14/338,484

(22) Filed: Jul. 23, 2014

(65) Prior Publication Data

US 2015/0027246 A1    Jan. 29, 2015

(30) Foreign Application Priority Data

Jul. 25, 2013 (EP) .................................... 13178003

(51) Int. Cl.
*F16H 19/04* (2006.01)
*B21D 28/26* (2006.01)
(Continued)

(52) U.S. Cl.
CPC ............. *F16H 19/04* (2013.01); *B21D 28/265* (2013.01); *B21D 43/11* (2013.01); *B23Q 5/385* (2013.01); *B23Q 5/56* (2013.01); *Y10T 74/18096* (2015.01)

(58) Field of Classification Search
CPC ....... F16H 19/04; B21D 28/265; B21D 43/11; B23Q 5/385; B23Q 5/56
(Continued)

(56) References Cited

U.S. PATENT DOCUMENTS 3,220,276 A * 11/1965 Bruns ...................... B23Q 5/56
                                                    408/234
3,310,821 A *  3/1967 Rehberg ................. B23G 9/002
                                                    29/56.6
(Continued)

FOREIGN PATENT DOCUMENTS

| DE | 2805532 C2 | 1/1988 |
| EP | 0585576 A1 | 3/1994 |
| FR | 2622945 A1 | 5/1989 |

OTHER PUBLICATIONS

"Supporting rotary devices by means of needle bearings", English translation, Werkstatt and Betrieb, Carl Hanser Verlag GmbH + Co. KG, 124, Feb. 1991, No. 2, Munich, Germany, 2 pages.

*Primary Examiner* — William Kelleher
*Assistant Examiner* — Zakaria Elahmadi
(74) *Attorney, Agent, or Firm* — Fish & Richardson P.C.

(57) ABSTRACT

A drive device for a movement unit of a machine tool includes a first toothed element driven by a drive motor and provided as a drive pinion including a first tooth arrangement and a second toothed element provided as a toothed rack including a second tooth arrangement. One of the first and second toothed elements is connected to a machine frame, and the other of the first and second toothed elements is connected to the movement unit. The first and second toothed elements are moved relative to each other along a movement axis of the first and second toothed elements by the drive motor via a meshing between the first and second tooth arrangements and via an engagement between the first and second tooth arrangements along an engagement axis that extends perpendicularly to the movement axis.

20 Claims, 5 Drawing Sheets (51) Int. Cl.
*B21D 43/11* (2006.01)
*B23Q 5/38* (2006.01)
*B23Q 5/56* (2006.01)

(58) Field of Classification Search
USPC 74/30, 428; 358/498, 497, 474, 505; 483/55
See application file for complete search history.

(56) References Cited

U.S. PATENT DOCUMENTS

| | | | | |
|---|---|---|---|---|
| 4,165,583 A | * | 8/1979 | Meyer | E05F 11/423 49/349 |
| 4,274,801 A | | 6/1981 | Herb et al. | |
| 4,487,281 A | * | 12/1984 | Cordiano | B62D 5/22 180/428 |
| 4,555,853 A | | 12/1985 | Lenz | |
| 5,303,104 A | * | 4/1994 | Aruga | G11B 5/5521 360/246.1 |
| 5,623,176 A | * | 4/1997 | Brandt, Jr. | F16H 19/04 310/80 |
| 5,792,483 A | * | 8/1998 | Siegrist | B29C 45/5008 425/135 |
| 5,810,646 A | * | 9/1998 | Hepworth | B23Q 5/00 451/273 |
| 5,875,988 A | * | 3/1999 | Hashimoto | H01F 41/08 242/434.8 |
| 6,093,989 A | * | 7/2000 | Joffe | B23Q 5/408 310/103 |
| 6,369,940 B1 | * | 4/2002 | Nishida | G02B 21/26 359/391 |
| 8,570,612 B2 | * | 10/2013 | Lee | H04N 1/1017 358/474 |
| 8,951,176 B2 | * | 2/2015 | Sgarabottolo | C03B 33/027 483/55 |
| 2002/0197124 A1 | * | 12/2002 | Kitamura | B23Q 1/626 409/235 |
| 2005/0005722 A1 | * | 1/2005 | Nishimoto | F16H 19/04 74/422 |
| 2008/0121010 A1 | * | 5/2008 | Battheu | B21D 43/11 72/422 |
| 2011/0094820 A1 | * | 4/2011 | Bootz | B60R 25/021 180/422 |
| 2012/0073392 A1 | * | 3/2012 | Balc | B25B 5/061 74/29 |
| 2013/0025386 A1 | * | 1/2013 | Callahan | F16H 19/04 74/89 |
| 2013/0106130 A1 | * | 5/2013 | Yoder | F16H 19/04 296/26.02 |
| 2014/0039666 A1 | * | 2/2014 | Kim | B23Q 5/56 700/174 |
| 2014/0208894 A1 | * | 7/2014 | Miller | F16H 19/04 74/665 G |
| 2014/0260717 A1 | * | 9/2014 | Klovstad | F16H 29/04 74/30 |
| 2014/0336028 A1 | * | 11/2014 | Takahashi | B31B 1/64 493/199 |
| 2015/0040700 A1 | * | 2/2015 | Walls | F16H 19/04 74/89.17 |

* cited by examiner

DRIVE DEVICES FOR MOVEMENT UNITS OF MACHINE TOOLS AND RELATED MACHINE TOOLS

CROSS REFERENCE TO RELATED APPLICATIONS

This application claims priority under 35 U.S.C. §119 to EP application serial number 13 178 003.3 filed on Jul. 25, 2013. The contents of this priority application are hereby incorporated by reference in their entirety.

TECHNICAL FIELD

The present disclosure relates to drive devices for movement units of machine tools and related such machine tools.

BACKGROUND

Punch-laser combination machines may include generic drive devices. For such machines, a machine table which acts as a support for metal sheets to be processed is moved on a C-shaped machine frame by a rack and pinion drive along a lower frame leg of the machine frame. The toothed rack of the rack and pinion drive is provided on the machine table and moves together therewith. The drive pinion which meshes with the rack is supported on the machine frame in a stationary manner. The drive pinion is pre-tensioned in the direction towards the rack and, in the direction of the engagement of the tooth arrangements of the rack and the drive pinion, can carry out compensation movements as needed, for example, owing to production and assembly tolerances and/or owing to thermal expansion on the rack and pinion drive.

The pre-tensioning of the drive pinion is produced by pre-tensioned spring assemblies which act on the drive pinion at the side remote from the rack. In order to prevent the drive pinion from tilting during compensation movements with respect to the rack about a rotation axis which extends parallel to the axis of the rack movement, the drive pinion is forcibly guided by linear guides in the direction of the compensation movements. Owing to undesirable tilting movements of the drive pinion, the mutual engagement of the tooth arrangements of the rack and the drive pinion may be affected. For example, there may be produced an irregular inclination of the tooth arrangement of the drive pinion with respect to the tooth arrangement of the rack, and together with this, an impairment of the force transmission between the drive pinion and the rack, and therefore increased wear on the tooth arrangements which mesh with each other.

SUMMARY

Implementations of the present disclosure can prevent undesirable tilting movements on tooth arrangements which are in engagement with each other in a functionally reliable manner A drive device for a movement unit of a machine tool includes a first toothed element driven by a drive motor and provided as a drive pinion including a first tooth arrangement and a second toothed element provided as a toothed rack including a second tooth arrangement. One of the first and second toothed elements is connected to a machine frame, and the other of the first and second toothed elements is connected to the movement unit. The first and second toothed elements are moved relative to each other along a movement axis of the first and second toothed elements by the drive motor via a meshing between the first and second tooth arrangements and via an engagement between the first and second tooth arrangements along an engagement axis that extends perpendicularly to the movement axis.

The first and second toothed elements are resiliently supported on each other parallel to the engagement axis via at least one of the first and second toothed elements that serves as a resilient toothed element, the resilient toothed element being supported by a bearing device on a connection element, by which the resilient toothed element is connected to the machine frame or to the movement unit, in such a manner that the resilient toothed element, under a redirection action of a redirection force (FD) applied by the other of the first and second toothed elements to the resilient toothed element parallel to the engagement axis, and counter to a restoring action of a restoring force which is directed counter to the redirection force (FD), can be redirected relative to the connection element parallel to the engagement axis.

An action line of the redirection force (FD) with respect to the bearing device is offset perpendicularly relative to a plane that is defined by the movement axis of the first and second toothed elements and the engagement axis.

For the resilient toothed element, there is provided a torque compensator which counteracts a redirection rotation movement of the resilient toothed element that results from the redirection force (FD) about a rotation axis that extends parallel to the movement axis of the resilient toothed element.

The torque compensator for the resilient toothed element has a redirection member that, at a side of the resilient toothed element, is pivotably articulated about a first pivot axis at the side of the resilient toothed element, and at a side of the machine frame connected to the resilient toothed element or to the movement unit that is connected to the resilient toothed element, is pivotably articulated about a second pivot axis remote from the resilient toothed element, the first and second pivot axes extending parallel to the rotation axis of the resilient toothed element, and, as a result of a redirection force (FD) being applied to the resilient toothed element, forces the resilient toothed element to carry out a reaction rotation movement that is directed counter to the redirection rotation movement of the resilient toothed element.

A tilting of a resilient toothed element which is acted on with a redirection force is counteracted by a redirection member which attempts, in response to the redirection force, to force the resilient toothed element into a reaction rotation movement by which the tendency of the resilient toothed element to carry out a tilting movement brought about by the redirection force is compensated for in most part. Accordingly, the redirection member, under the action of the redirection force applied to the resilient toothed element, stabilizes the desired orientation of the resilient toothed element about a rotation axis which extends parallel to the movement axis of the toothed elements. Consequently, the tooth arrangement of the resilient toothed element retains a desired orientation with respect to the tooth arrangement of the toothed element which is associated with the resilient toothed element in a tilt-free manner in spite of the redirection force acting on the resilient toothed element.

The torques which are produced by the redirection force at the location of the introduction of force into the resilient toothed element and at the redirection member side, and which each seek to rotate the resilient toothed element about a rotation axis which extends parallel to the movement axis of the toothed elements, are directed counter to each other and therefore cancel each other out in terms of their action. Consequently, the resilient toothed element moves in such a manner that it is, under the action of the redirection force, in a state guided by the redirection member and does not tilt in the action direction of the redirection force. Although, owing to the pivot movement which the redirection member which is articulated to the resilient toothed element carries out, a movement perpendicular to the plane defined by the movement axis and the engagement axis of the toothed elements is associated with the redirecting movement of the resilient toothed element in the action direction of the redirection force. The extent of this movement, owing to the small pivot angle of the redirection member and owing to a corresponding configuration of the redirection member, is minimal and consequently negligible.

The redirection member is advantageously a component which is structurally simple, maintenance-free, able to be accommodated in a space-saving manner, and at the same time prevents undesirable tilting movements of the resilient toothed element in a functionally reliable manner. The redirection member is pivotably articulated at the side of the resilient toothed element about a toothed-element-side pivot axis (e.g., a first pivot axis) and about a pivot axis (e.g., a second pivot axis) which is remote from the toothed element. Depending on whether the resilient toothed element is connected to the machine frame or to the movement unit of the machine tool, the pivot axis of the redirection member remote from the toothed element is located at the side of the machine frame or at the side of the movement unit. At the toothed element side, the redirection member may be fitted directly to the resilient toothed element. Alternatively, it is possible for the redirection member to be articulated to a carrier structure which itself supports the resilient toothed element. The latter possibility is used in particular when the resilient toothed element is formed by the drive pinion of the drive device, which is rotatably supported on a carrier structure. While the example toothed rack is provided as a linear toothed element, curved toothed racks are also conceivable.

In some embodiments, the redirection member of the torque compensator for the resilient toothed element is provided between the resilient toothed element and the connection element. A connection-element-side pivot axis is consequently provided as the pivot axis of the redirection member remote from the toothed element. Accordingly, the resilient toothed element is coupled to the connection element both via the bearing device which is resilient and parallel to the engagement axis of the tooth arrangements which mesh with each other and via the redirection member of the torque compensator. Consequently, the resilient toothed element, the resilient bearing device thereof, the redirection member of the torque compensator, and the connection element form a compact structural unit which combines a variety of functions.

In certain embodiments, the resilient toothed element is suspended on the connection element by the redirection member of the torque compensator. In the direction of gravitational force, the redirection member is consequently subjected to a tensile load by the resilient toothed element. In this regard, a redirection member with sufficient tensile strength is selected, whilst the pressure resistance of the redirection member is less significant.

In some embodiments, the redirection member is formed by a metal sheet (e.g., a resilient metal sheet). The torque compensator is in this instance produced with simple means. For pivotably movable coupling of the metal sheet to the resilient toothed element to the machine frame, and to the movement unit or the connection element, some embodiments may do without a conventional articulation connection. For example, simple weld connections may form the pivot axis at the toothed element side and also the pivot axis remote from the toothed element. The use of a metal sheet as a redirection member of the torque compensator for the resilient toothed element is advantageous in particular when the resilient toothed element is suspended on the connection element via the metal sheet and the metal sheet has to transmit substantially tensile forces.

The resilient support of the resilient toothed element on the connection element can be structurally constructed in different manners. In certain embodiments, a solid body articulation is used as a bearing device for the resilient toothed element. The base member of the rack provided with the respective tooth arrangement or a carrier structure for the drive pinion, such as the remaining connection element, are regions of one and the same component that are connected to each other by a zone of reduced flexural rigidity and can consequently move relative to each other in the direction of the redirection force and the restoring force which is directed counter to this. Solid body articulations are constructed in a structurally simple manner, are substantially maintenance-free, and can be produced in a cost-effective manner.

Some embodiments have a particularly space-saving and weight-saving construction, in the case of which the connection element associated with the resilient toothed element has a portal-like frame, and the redirection member of the torque compensator for the resilient toothed element is arranged between the portal legs of the portal-like frame.

In certain embodiments, the redirection member of the torque compensator for the resilient toothed element is preferably pivotably fitted to the portal bridge of the portal-like frame. In particular, it is possible for the resilient toothed element to be suspended on the portal bridge of the portal-like frame by the redirection member of the torque compensator.

The at least partial construction of the connection element associated with the resilient toothed element as a portal-like frame affords the possibility of providing an access to the resilient toothed element between the portal legs of the portal-like frame in a simple manner. In this manner, the bearing device for resilient support of the resilient toothed element on the associated connection element can, for example, be made accessible. In particular, it is possible to adjust a pre-tensioning of the resilient toothed element with respect to the other toothed element using appropriate auxiliary means through the access provided on the portal-like frame.

In some embodiments, the connection element which is associated with the resilient toothed element is distinguished by specific manufacturing-related advantages and by a particularly light construction which nonetheless has a load-bearing capacity.

Other aspects, features, and advantages will be apparent from the description, the claims, and the drawings.

DETAILED DESCRIPTION

Figure 1:
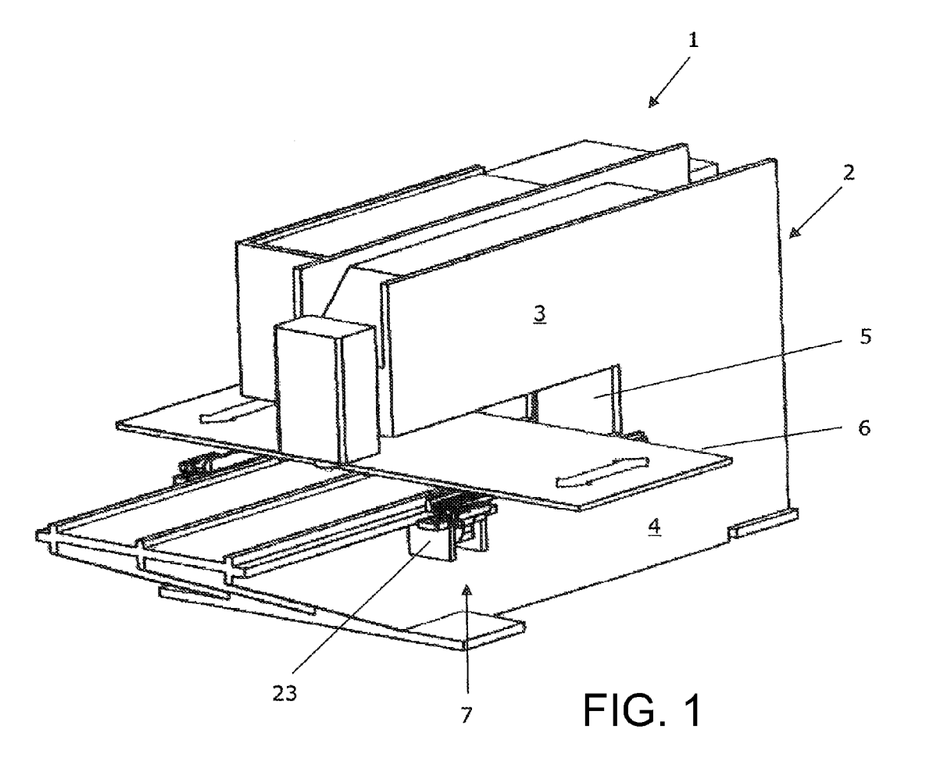
FIG. 1 shows a punch-laser combination-machine having a machine table and a rack and pinion drive for the machine table.

According to FIG. 1, a machine tool 1 which is constructed as a punch-laser combination-machine has a C-shaped machine frame 2 having an upper frame leg 3 and a lower frame leg 4. The frame legs 3, 4 themselves delimit a throat space 5 of the machine frame 2. A machine table 6 is supported on the lower frame leg 4 as a movement unit of the machine tool 1. Metal sheets, which are not illustrated, and which are processed on the machine tool 1, are supported on the machine table 6 and are moved or positioned relative to the processing devices of the machine tool 1 by a conventional coordinate guide. In this instance, the machine table 6 travels together with the metal sheets that are deposited thereon along the lower frame leg 4.

The movements of the machine table 6 are produced by a drive device which is constructed as a rack and pinion drive 7. According to FIG. 2, the rack and pinion drive 7 includes as toothed elements a toothed rack 8, which includes a rack tooth arrangement 9, and a drive pinion 10, which has a pinion tooth arrangement 11. In the example illustrated, the rack tooth arrangement 9 and the pinion tooth arrangement 11 are constructed as helical gears. The rack tooth arrangement 9 and the pinion tooth arrangement 11 engage each other along an engagement axis 12 indicated in FIG. 2 with dot-dash lines. A drive motor 13 of the rack and pinion drive 7 drives the drive pinion 10 about the pinion rotation axis 14.

Figure 2:
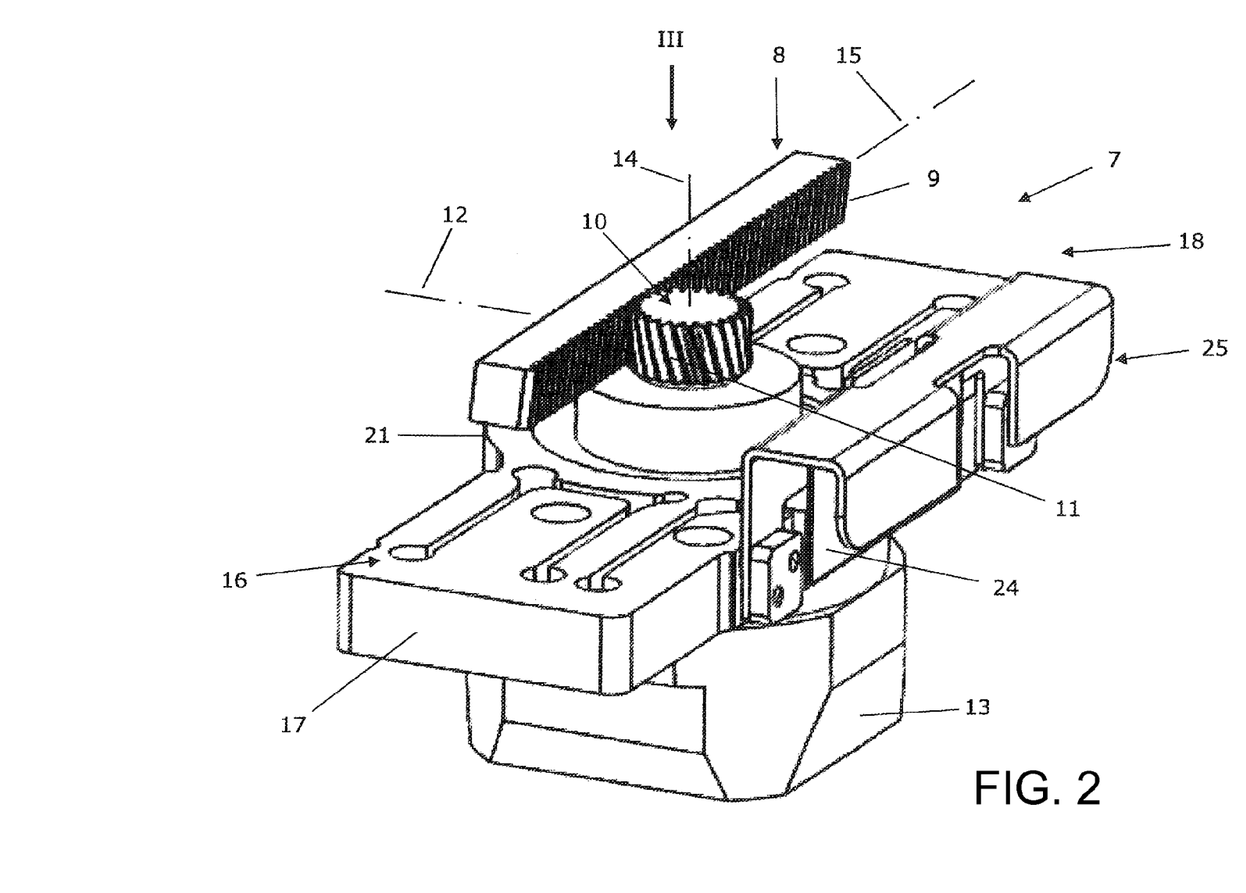
FIG. 2 shows a detailed illustration of the rack and pinion drive according to FIG. 1.

The rack 8 is mounted on the machine table 6 and moves together therewith. The drive pinion 10 and the drive motor 13 are supported in a stationary manner on the machine frame 2, specifically on the lower frame leg 4. When the drive pinion 10 driven by the drive motor 13 rotates about a pinion rotation axis 14, the rack 8, together with the machine table 6 which is connected thereto, is moved along a movement axis 15 on the lower frame leg 4 of the machine frame 2.

In order to ensure a play-free mutual engagement between the rack tooth arrangement 9 and the pinion tooth arrangement 11, the drive pinion 10 is resiliently pre-tensioned along the engagement axis 12 towards the rack 8. To this end, the drive pinion 10 is supported together with the drive motor 13 by a bearing device which is constructed as a solid body articulation 16 on an assembly plate 17 of a connection element 18, by which the drive pinion 10 is connected to the lower frame leg 4 of the machine frame 2.

Figure 3:
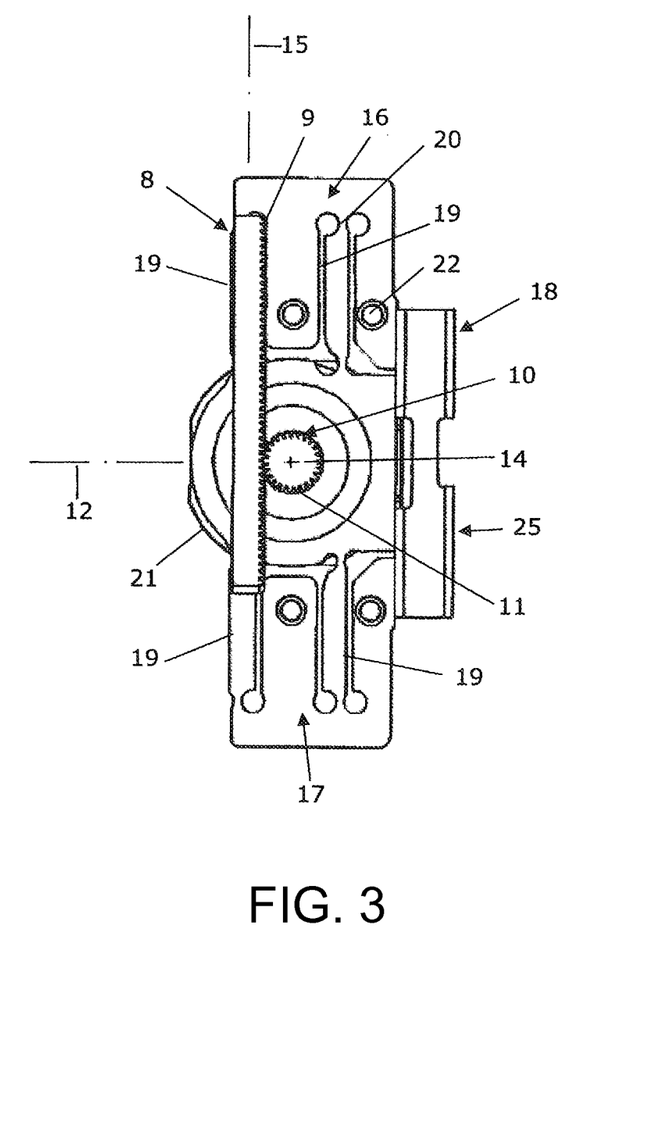
FIG. 3 i shows the rack and pinion drive according to FIG. 2 in the direction of the arrow III in FIG. 2.

As can be seen in particular in FIG. 3, the solid body articulation 16 includes a total of four articulation arms 19 which are connected in a materially integral manner by a region 20 of reduced flexural rigidity to a carrier plate 21 which acts as a carrier structure for the drive pinion 10 and the drive motor 13. The articulation arms 19 are further connected to the assembly plate 17 of the connection element 18. The solid body articulation 16 ensures that the drive pinion 10 can be redirected along the engagement axis 12 of the rack tooth arrangement 9 and the pinion tooth arrangement 11 counter to the action of a restoring force, such that the drive pinion 10 can consequently serve as a resilient toothed element. If the assembly plate 17 is screwed at securing holes 22 to a console 23 which is fitted to the lower frame leg 4 of the machine frame 2 (FIG. 1) with appropriate spacing from the lower frame leg 4, the above-mentioned pre-tensioning of the drive pinion 10 towards the rack 8 which is fitted to the machine table 6 is produced.

In addition to the solid body articulation 16, a redirection member which is constructed as a redirection plate 24 forms a connection between the drive pinion 10 or the carrier plate 21 which is provided therewith and the connection element 18. In the example illustrated, there is provided as a redirection plate 24 a resilient metal sheet which is connected (e.g., in this instance welded) at the lower edge thereof in FIG. 2 to the bearing plate 21 and at the upper edge thereof in FIG. 2 to the connection element 18. In this instance, the redirection plate 24 is secured to the connection element 18 at a portal-like frame 25 which is produced as a punched and bent component.

When the rack 8 with the machine table 6 which is connected thereto is driven along the movement axis 15 by the drive pinion 10, which is driven by the drive motor 13 and which rotates about the pinion rotation axis 14, forces are applied by the rack 8 to the drive pinion 10 along the engagement axis 12 as a result of production or assembly-related tolerances. The effects which occur in this instance on the rack and pinion drive 7 are explained with reference to the schematic illustration of FIG. 4.

Figure 4:
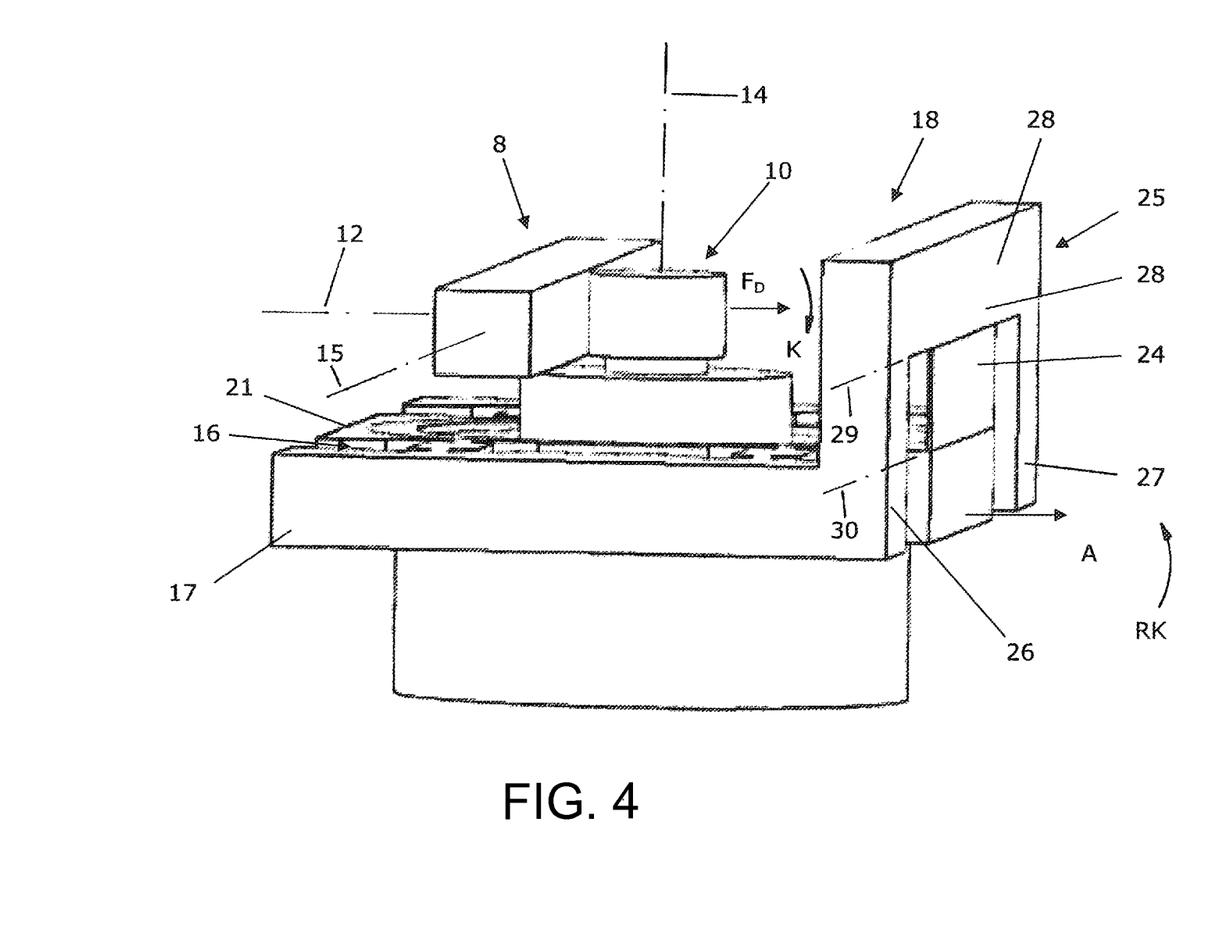
FIG. 4 shows the operating method of the rack and pinion drive according to FIGS. 1-3.

The rack 8 and the drive pinion 10 are shown in FIG. 4 for the sake of clarity without the rack tooth arrangement 9 and the pinion tooth arrangement 11 which meshes therewith. Also not illustrated in detail are the screw connections which can be seen in FIG. 2 and by which the portal-like frame 25 is connected at portal legs 26, 27 to the assembly plate 17 of the connection element 18. The carrier plate 21 is suspended via the redirection plate 24 on a portal bridge 28 of the portal-like frame 25 extending between the portal legs 26, 27.

If, for example, owing to production or assembly tolerances, the rack 8 which moves along the movement axis 15 applies a force $F_D$ to the drive pinion 10, the force $F_D$ acts as a redirection force which redirects the drive pinion 10 in an action direction of the force out of the initial position as shown in FIG. 4. The redirection of the drive pinion 10 is carried out in this instance counter to the action of a restoring force, which is produced on the solid body articulation 16 provided between the carrier plate 21 and the assembly plate 17 of the connection element 18. Owing to the offset existing perpendicularly relative to the plane defined by the engagement axis 12 and the movement axis 15 between the action line of the redirection force $F_D$ and the resilient support of the drive pinion 10 on the connection element 18, which support is produced by the solid body articulation 16, the redirection force $F_D$ seeks to rotate the drive pinion 10 about the solid body articulation 16 and thereby to tilt it relative to the rack 8. The axis of this desired redirection rotation movement extends parallel with the movement axis 15. The rotation direction is indicated by an arrow K.

Although the solid body articulation 16 counteracts such a redirection rotation movement of the drive pinion 10, the solid body articulation 16 is, owing to the softness thereof, not capable of completely preventing a redirection rotation movement of the drive pinion 10. The redirection rotational movability of the drive pinion 10 permitted by the solid body articulation 16 is eliminated by the redirection plate 24. The redirection plate 24 is secured with the lower edge thereof to the carrier plate 21 and with the upper edge thereof to the connection element 18, specifically to the portal bridge 28 of the portal-like frame 25 of the connection element 18.

Owing to the action by the redirection force $F_D$, the drive pinion 10 moves together with the carrier plate 21 in the direction of an arrow A in FIG. 4. Owing to the movement of the carrier plate 21 in the direction of the arrow A, the redirection plate 24, by which the carrier plate 21 is suspended on the connection element 18, carries out, relative to the connection element 18, a pivot movement about a pivot axis 29 which is remote from the toothed element and which in this instance is at the connection element side and, relative to the carrier plate 21, a pivot movement about a pivot axis 30 at the toothed element side. The pivot axis 29 remote from the toothed element is formed by the weld connection between the redirection plate 24 and the portal-like frame 25 of the connection element 18, and the pivot axis 30 at the toothed element side is formed by the weld connection between the redirection plate 24 and the carrier plate 21.

Owing to the pivot movement of the redirection plate 24 carried out in response to the redirection force $F_D$, the carrier plate 21 which is secured to the redirection plate 24 seeks to rotate, together with the drive pinion 10, in a direction RK indicated by an arrow with a reaction rotation movement about the fixed body articulation 16, and in this instance, about an axis which extends parallel with the movement axis 15. However, since the rotation direction K and the rotation direction RK are mutually opposed, the carrier plate 21, and thus also the drive pinion 10, consequently retain their orientations regardless of the redirection force $F_D$ and the torque produced thereby on the drive pinion 10. An undesirable tilting movement of the drive pinion 10 with respect to the rack 8 is consequently prevented.

Figure 5:
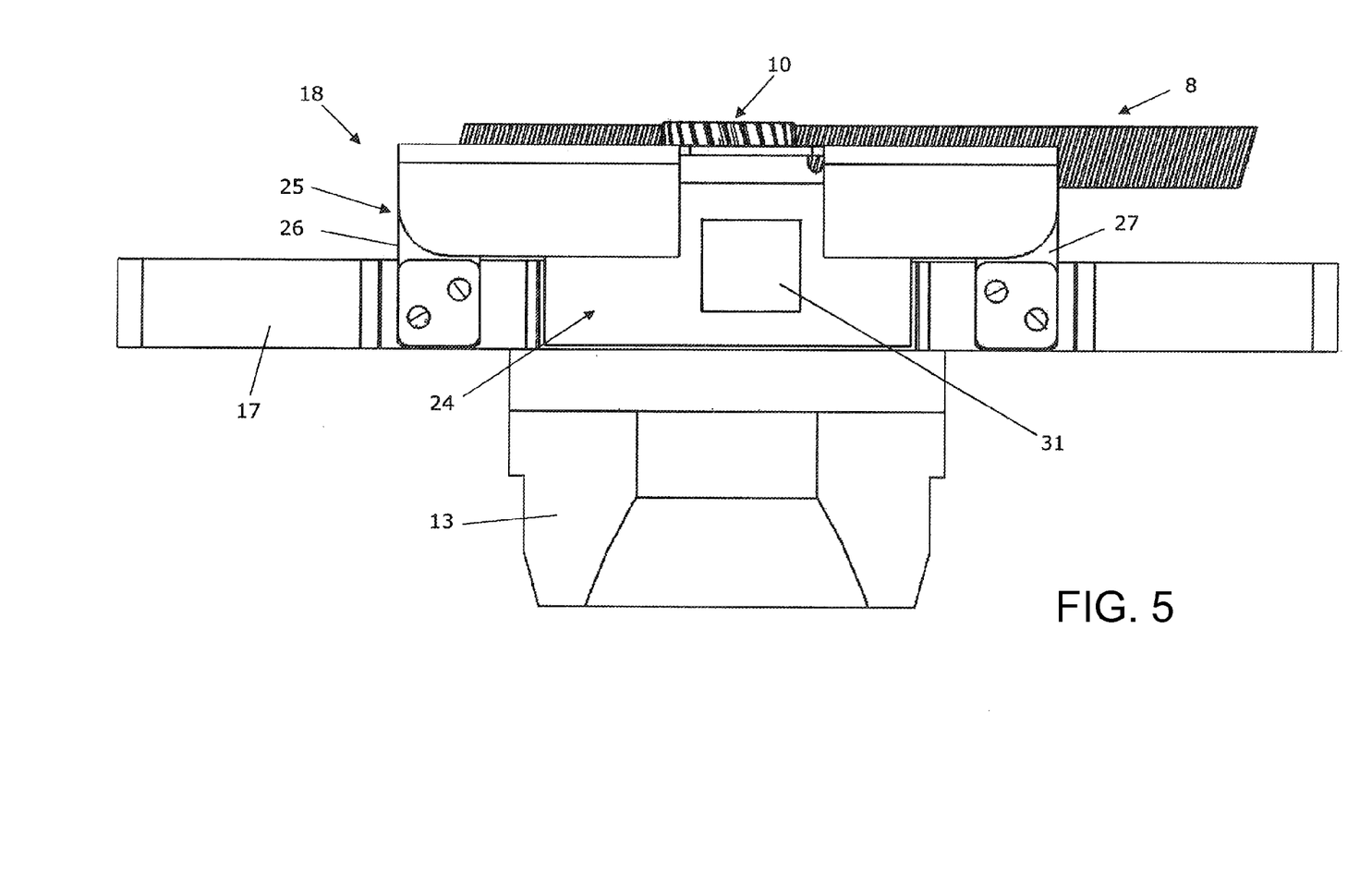
FIG. 5 shows a specific embodiment of the rack and pinion drive according to FIGS. 1-3.

The arrangement shown in FIG. 5 differs from the arrangement according to FIGS. 2-4 in that the redirection plate 24 between the portal legs 26, 27 of the portal-like frame 25 is provided with an aperture 31 which forms an access to the resilient toothed element (e.g., an access to the solid body articulation 16). Through the aperture 31, it is possible, for example, to preset the position which the carrier plate 21 provided with the drive pinion 10 assumes relative to the connection element 18 before assembly of the rack and pinion drive 7. In particular, a corresponding adjustment wedge can protrude through the aperture 31.

What is claimed is:

1. A drive device for a movement unit of a machine tool, comprising:

a first toothed element driven by a drive motor and provided as a drive pinion including a first tooth arrangement; and a second toothed element provided as a toothed rack including a second tooth arrangement, wherein one of the first and second toothed elements is connected to a machine frame, and the other of the first and second toothed elements is connected to the movement unit, wherein the first and second toothed elements are moved relative to each other along a movement axis of the first and second toothed elements by the drive motor via a meshing between the first and second tooth arrangements and via an engagement between the first and second tooth arrangements along an engagement axis that extends perpendicularly to the movement axis, wherein the first and second toothed elements are resiliently supported on each other parallel to the engagement axis via at least one of the first and second toothed elements that serves as a resilient toothed element, the resilient toothed element being supported by a resilient bearing device on a connection element, by which the resilient toothed element is connected to the machine frame or to the movement unit, in such a manner that the resilient toothed element, under a redirection action of a redirection force ($F_D$) applied by the other of the first and second toothed elements to the resilient toothed element parallel to the engagement axis, and counter to a restoring action of a restoring force which is directed counter to the redirection force ($F_D$), can be redirected relative to the connection element parallel to the engagement axis, wherein an action line of the redirection force ($F_D$) with respect to the resilient bearing device is offset perpendicularly relative to a plane that is defined by the movement axis of the first and second toothed elements and the engagement axis, wherein, for the resilient toothed element, there is provided a torque compensator in addition to the resilient bearing device, wherein the torque compensator counteracts a redirection rotation movement of the resilient toothed element that results from the redirection force ($F_D$) about a rotation axis that extends parallel to the movement axis of the resilient toothed element, and wherein the torque compensator for the resilient toothed element has a redirection member that, at a side of the resilient toothed element, is pivotably articulated about a first pivot axis at the side of the resilient toothed element, and at a side of the machine frame connected to the resilient toothed element or to the movement unit that is connected to the resilient toothed element, is pivotably articulated about a second pivot axis remote from the resilient toothed element, the first and second pivot axes extending parallel to the rotation axis of the resilient toothed element, and, as a result of a redirection force ($F_D$) being applied to the resilient toothed element, forces the resilient toothed element to carry out a reaction rotation movement that is directed counter to the redirection rotation movement of the resilient toothed element.

2. The drive device according to claim 1, wherein the redirection member of the torque compensator for the resilient toothed element is provided between the resilient toothed element and the connection element such that a connection-element-side pivot axis is provided as the second pivot axis remote from the resilient toothed element.

3. The drive device according to claim 2, wherein the resilient toothed element is suspended on the connection element by the redirection member.

4. The drive device according to claim 1, wherein the redirection member is formed by a metal sheet that can be pivoted about the first pivot axis at the side of the resilient toothed element and about the second pivot axis remote from the resilient toothed element.

5. The drive device according to claim 4, wherein the metal sheet is a resilient metal sheet.

6. The drive device according to claim 1, wherein the resilient toothed element is supported by the resilient bearing device in the form of a solid body articulation on the connection element so as to be able to be redirected parallel to the engagement axis and counter to a direction of the restoring force.

7. The drive device according to claim 1, wherein the connection element has a portal-like frame having two portal legs and a portal bridge that connects the two portal legs to each other such that the redirection member of the torque compensator for the resilient toothed element is arranged between the portal legs of the portal-like frame.

8. The drive device according to claim 7, wherein the redirection member of the torque compensator for the resilient toothed element is supported at a connection element side on the portal bridge of the portal-like frame of the connection element so as to be able to be pivoted about the connection-element-side pivot axis that is provided as the second pivot axis remote from the resilient toothed element.

9. The drive device according to claim 7, wherein an access to the resilient toothed element is provided in an intermediate space between the portal legs of the portal-like frame of the connection element.

10. The drive device according to claim 1, wherein the connection element is constructed at least partially as a sheet metal component.

11. The drive device according to claim 10, wherein the sheet metal component is a bent sheet metal component.

12. A machine tool for processing workpieces, comprising:
a machine frame;
a movement unit that can be moved on the machine frame by a drive device that comprises:
  a first toothed element driven by a drive motor and provided as a drive pinion including a first tooth arrangement; and
  a second toothed element provided as a toothed rack including a second tooth arrangement,
wherein one of the first and second toothed elements is connected to a machine frame, and the other of the first and second toothed elements is connected to the movement unit,
wherein the first and second toothed elements are moved relative to each other along a movement axis of the first and second toothed elements by the drive motor via a meshing between the first and second tooth arrangements and via an engagement between the first and second tooth arrangements along an engagement axis that extends perpendicularly to the movement axis,
wherein the first and second toothed elements are resiliently supported on each other parallel to the engagement axis via at least one of the first and second toothed elements that serves as a resilient toothed element, the resilient toothed element being supported by a resilient bearing device on a connection element, by which the resilient toothed element is connected to the machine frame or to the movement unit, in such a manner that the resilient toothed element, under a redirection action of a redirection force ($F_D$) applied by the other of the first and second toothed elements to the resilient toothed element parallel to the engagement axis, and counter to a restoring action of a restoring force which is directed counter to the redirection force ($F_D$), can be redirected relative to the connection element parallel to the engagement axis,
wherein an action line of the redirection force ($F_D$) with respect to the resilient bearing device is offset perpendicularly relative to a plane that is defined by the movement axis of the first and second toothed elements and the engagement axis,
wherein, for the resilient toothed element, there is provided a torque compensator in addition to the resilient bearing device, wherein the torque compensator counteracts a redirection rotation movement of the resilient toothed element that results from the redirection force ($F_D$) about a rotation axis that extends parallel to the movement axis of the resilient toothed element, and
wherein the torque compensator for the resilient toothed element has a redirection member that, at a side of the resilient toothed element, is pivotably articulated about a first pivot axis at the side of the resilient toothed element, and at a side of the machine frame connected to the resilient toothed element or to the movement unit that is connected to the resilient toothed element, is pivotably articulated about a second pivot axis remote from the resilient toothed element, the first and second pivot axes extending parallel to the rotation axis of the resilient toothed element, and, as a result of a redirection force ($F_D$) being applied to the resilient toothed element, forces the resilient toothed element to carry out a reaction rotation movement that is directed counter to the redirection rotation movement of the resilient toothed element.

13. The machine tool according to claim 12, wherein the redirection member of the torque compensator for the resilient toothed element is provided between the resilient toothed element and the connection element such that a connection-element-side pivot axis is provided as the second pivot axis remote from the resilient toothed element.

14. The machine tool according to claim 13, wherein the resilient toothed element is suspended on the connection element by the redirection member.

15. The machine tool according to claim 12, wherein the redirection member is formed by a metal sheet that can be pivoted about the first pivot axis at the side of the resilient toothed element and about the second pivot axis remote from the resilient toothed element.

16. The machine tool according to claim 15, wherein the metal sheet is a resilient metal sheet.

17. The machine tool according to claim 12, wherein the resilient toothed element is supported by the resilient bearing device in the form of a solid body articulation on the connection element so as to be able to be redirected parallel to the engagement axis and counter to a direction of the restoring force.

18. The machine tool according to claim 12, wherein the connection element has a portal-like frame having two portal legs and a portal bridge that connects the two portal legs to each other such that the redirection member of the torque compensator for the resilient toothed element is arranged between the portal legs of the portal-like frame.

19. The machine tool according to claim 18, wherein the redirection member of the torque compensator for the resilient toothed element is supported at a connection element side on the portal bridge of the portal-like frame of the connection element so as to be able to be pivoted about the connection-element-side pivot axis that is provided as the second pivot axis remote from the resilient toothed element.

20. The machine tool according to claim 18, wherein an access to the resilient toothed element is provided in an intermediate space between the portal legs of the portal-like frame of the connection element.

* * * * *